(12) United States Patent
Lin et al.

(10) Patent No.: US 12,366,938 B2
(45) Date of Patent: Jul. 22, 2025

(54) TOUCH DISPLAY PANEL, ELECTRONIC APPARATUS, AND DRIVER CIRCUIT

(71) Applicant: Novatek Microelectronics Corp., Hsinchu (TW)

(72) Inventors: Yi-Ying Lin, Hualien County (TW); Chih-Chang Lai, Taichung (TW)

(73) Assignee: Novatek Mircoelectronics Corp., Hsinchu (TW)

( * ) Notice: Subject to any disclaimer, the term of this patent is extended or adjusted under 35 U.S.C. 154(b) by 0 days.

(21) Appl. No.: 18/628,785

(22) Filed: Apr. 7, 2024

(65) Prior Publication Data

US 2024/0248564 A1 Jul. 25, 2024

Related U.S. Application Data

(63) Continuation-in-part of application No. 18/341,776, filed on Jun. 27, 2023, now Pat. No. 12,050,745, which is a continuation-in-part of application No. 17/813,608, filed on Jul. 20, 2022, now Pat. No. 11,726,610.

(60) Provisional application No. 63/603,120, filed on Nov. 28, 2023.

(51) Int. Cl.
G06F 3/041 (2006.01)
(52) U.S. Cl.
CPC ................ G06F 3/04166 (2019.05)
(58) Field of Classification Search
None
See application file for complete search history.

(56) References Cited

U.S. PATENT DOCUMENTS

| 10,310,656 B2 | 6/2019 | Ivanov et al. |
| 2011/0055753 A1* | 3/2011 | Horodezky ......... G06F 3/04883 715/810 |
| 2015/0227252 A1 | 8/2015 | Ivanov et al. |
| 2023/0072065 A1* | 3/2023 | Nakanishi ............ G06F 3/0446 |

FOREIGN PATENT DOCUMENTS

| CN | 116627271 | 8/2023 |
| TW | 201301110 | 1/2013 |
| TW | 201545609 | 12/2015 |

OTHER PUBLICATIONS

"Office Action of Taiwan Counterpart Application", issued on Jan. 24, 2025, p. 1-p. 7.

* cited by examiner

*Primary Examiner* — Duane N Taylor, Jr.
(74) *Attorney, Agent, or Firm* — JCIPRNET

(57) ABSTRACT

An electronic apparatus including a touch display panel and a driver circuit is provided. The touch display panel includes a plurality of first electrodes and at least one second electrode. The plurality of first electrodes are arranged in an active area of the touch display panel, and the at least one second electrode is arranged in a border area of the touch display panel. The driver circuit is coupled to the touch display panel. The driver circuit is configured to drive the plurality of first electrodes to perform a touch sensing operation in a first period. The driver circuit is configured to drive the plurality of first electrodes and the at least one second electrode to perform a gesture sensing operation in a second period.

17 Claims, 10 Drawing Sheets

TOUCH DISPLAY PANEL, ELECTRONIC APPARATUS, AND DRIVER CIRCUIT

CROSS-REFERENCE TO RELATED APPLICATION

This application claims the priority benefit of U.S. Provisional Application No. 63/603,120, filed on Nov. 28, 2023. This application is a continuation-in-part application of and claims the priority benefit of U.S. application Ser. No. 18/341,776, filed on Jun. 27, 2023. The prior U.S. application Ser. No. 18/341,776 is a continuation-in-part application of and claims the priority benefit of U.S. application Ser. No. 17/813,608, filed on Jul. 20, 2022, now patented as U.S. Pat. No. 11,726,610, issued on Aug. 15, 2023. The entirety of the above-mentioned patent application is hereby incorporated by reference herein and made a part of this specification.

BACKGROUND

Technical Field

The invention relates to a display panel, an electronic apparatus, and a driver circuit, and more particularly to a touch display panel, an electronic apparatus, and a driver circuit.

Description of Related Art

For non-contact sensing applications, e.g. a three-dimensional (3D) gesture sensing operation, optical modules require at least one set of infrared light source and infrared light sensor to block or change the light path of an object in the detection space for judgment. However, this requires an external module, increasing cost and weight. Additionally, optical modules are unable to distinguish between conductors (such as a human hand) and non-conductors, leading to a higher rate of misjudgment.

For capacitive sensing, if only sensors in the active area are used for 3D gesture sensing operation, objects must enter the active area. In addition, edge sensing may be relatively insensitive.

SUMMARY

The invention is directed to a touch display panel, an electronic apparatus, and a driver circuit, capable of effectively performing a gesture sensing operation.

An embodiment of the invention provides a touch display panel including a plurality of first electrodes and at least one second electrode. The plurality of first electrodes are arranged in an active area of the touch display panel. The plurality of first electrodes are configured to perform a touch sensing operation in a first period. The at least one second electrode is arranged in a border area of the touch display panel. The plurality of first electrodes and the at least one second electrode are configured to perform a gesture sensing operation in a second period.

An embodiment of the invention provides an electronic apparatus including a touch display panel and a driver circuit. The touch display panel includes a plurality of first electrodes and at least one second electrode. The plurality of first electrodes are arranged in an active area of the touch display panel, and the at least one second electrode is arranged in a border area of the touch display panel. The driver circuit is coupled to the touch display panel. The driver circuit is configured to drive the plurality of first electrodes to perform a touch sensing operation in a first period. The driver circuit is configured to drive the plurality of first electrodes and the at least one second electrode to perform a gesture sensing operation in a second period.

An embodiment of the invention provides a driver circuit. The driver circuit is coupled to the touch display panel. The driver circuit is configured to drive the plurality of first electrodes to perform the touch sensing operation in the first period. The driver circuit is configured to drive the plurality of first electrodes and the at least one second electrode to perform the gesture sensing operation in the second period.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
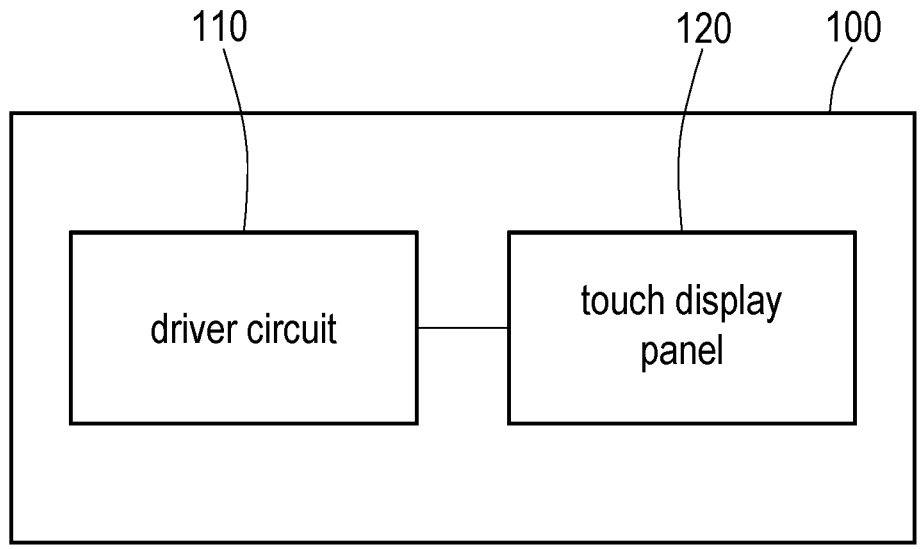
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 includes a driver circuit 110 and a touch display panel 120. The touch display panel 120 includes display pixels and touch sensors. The driver circuit 110 is configurable to be coupled to the touch display panel 120. The driver circuit 110 is configured to drive the touch display panel 120 to perform a display operation, a touch sensing operation and a gesture sensing operation.

Figure 2:
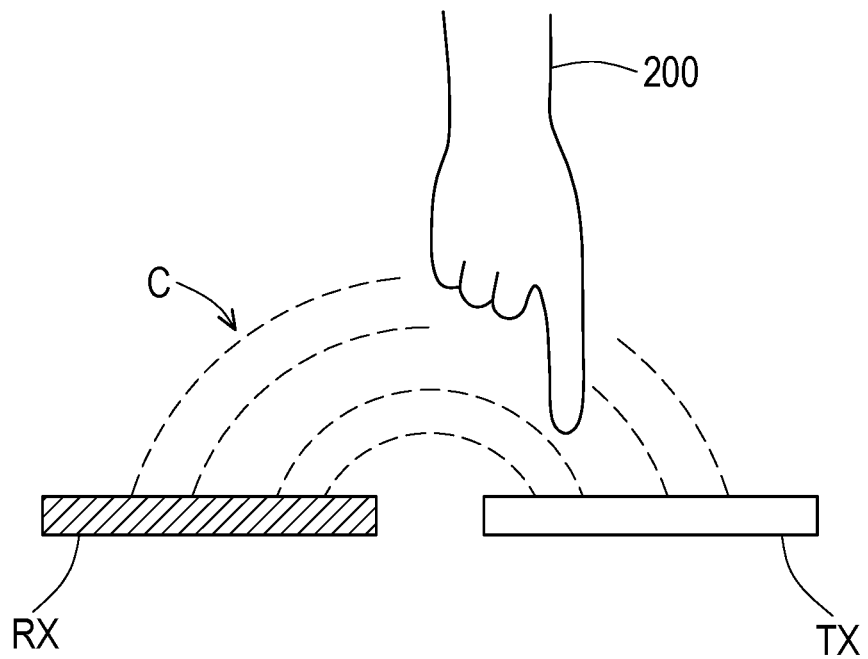
FIG. 2 is a schematic diagram illustrating a gesture sensing operation according to an embodiment of the invention.

FIG. 2 is a schematic diagram illustrating a gesture sensing operation according to an embodiment of the invention. Referring to FIG. 1 and FIG. 2, the touch display panel 120 includes a driving electrode TX and a sensing electrode RX, which are adjacent to each other. When the driver circuit 110 outputs a driving signal to the driving electrode TX in a gesture sensing period, the capacitance C may be formed between the driving electrode TX and the sensing electrode RX. When the capacitance C changes, it indicates a gesture 200 exists and can be detected, and the sensing electrode RX may output a sensing signal corresponding to the gesture 200 to the driver circuit 110, wherein the sensing signal may include information of capacitance variation. The driver circuit 110 can determine whether the gesture 200 exists and drive the touch display panel 120 to perform a corresponding operation according to the sensing signal.

Figure 3A:
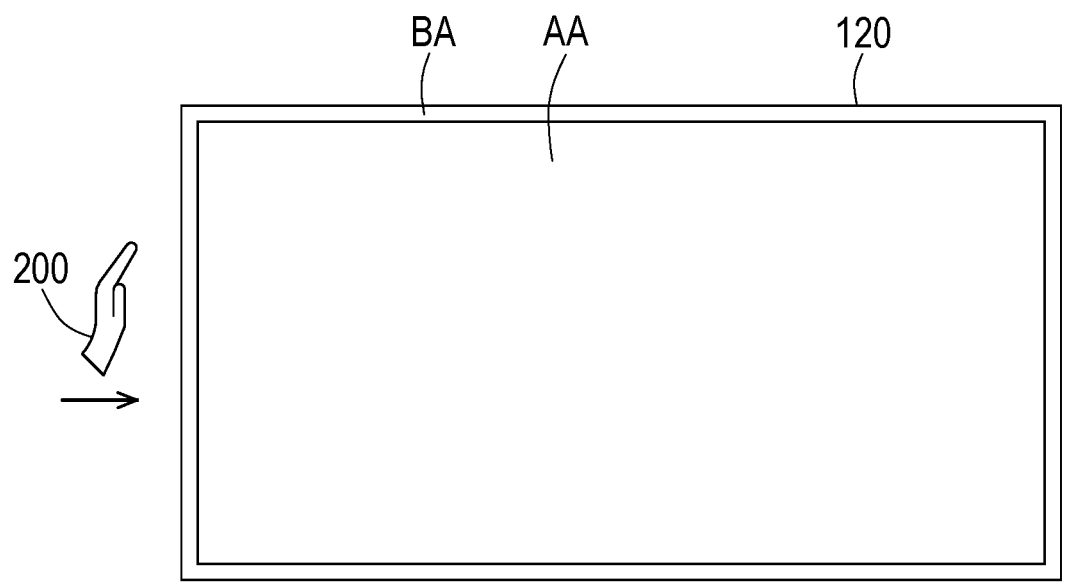
FIG. 3A and FIG. 3B are schematic diagrams illustrating a gesture sensing operation according to another embodiment of the invention.
Figure 3B:
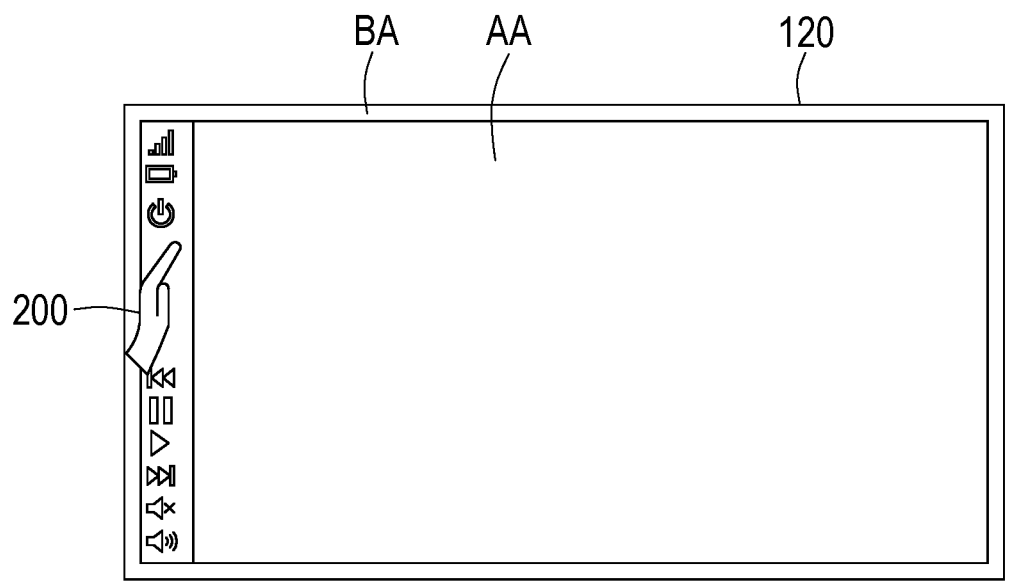

FIG. 3A and FIG. 3B are schematic diagrams illustrating a gesture sensing operation according to another embodiment of the invention. Referring to FIG. 1 to FIG. 3B, FIG. 3A shows that the gesture 200 moves from left to right, and the touch display panel 120 does not sense the gesture 200 yet. FIG. 3B shows the gesture 200 arrive at the touch display panel 120, and the touch display panel 120 can sense the movement of the gesture 200 via driving electrodes TX and sensing electrodes RX as depicted in FIG. 2 in the gesture sensing period.

To be specific, the touch display panel 120 includes an active area AA and a border area BA. The border area BA is around the active area AA. The active area AA is a display region, and the border area BA is a non-display region, for example. The driving electrodes TX are arranged in the active area AA of the touch display panel 120, and the sensing electrodes RX are arranged in the border area BA of the touch display panel 120. The driver circuit 110 can determine whether the gesture 200 moves according to information of capacitance variation of the driving electrodes TX and the sensing electrodes RX. In the present embodiment, when the driver circuit 110 detects the movement of the gesture 200, the driver circuit 110 may drive the touch display panel 120 to display a function list including application items and device information.

Application scenarios illustrated in FIG. 2 to FIG. 3B are taken for example, and the invention is not limited thereto.

In an embodiment, the electronic device 100 may be, but not limited to, a smartphone, a non-smart phone, a wearable electronic device, a tablet computer, a personal digital assistant, a notebook and other portable electronic devices that can operate independently and have the display function and the touch sensing function. In an embodiment, the electronic device 100 may be, but not limited to, a portable or un-portable electronic device in a vehicle intelligent system.

In an embodiment, the driver circuit 110 may include a display driving circuit and a touch sensing circuit and be implemented as a single chip integrated circuit that can drive and control the touch display panel 120 to perform the display operation, the touch sensing operation, and the gesture sensing operation. The driver circuit 110 may include a control circuit, and the control circuit may be a micro-controller based core to perform all of control activities of the display operation, the touch sensing operation and/or the fingerprint sensing operation. The control circuit may include at least one of a timing controller, a touch controller, a digital circuit, and the other controllers or processors of the display driving circuit, the touch sensing circuit and the fingerprint sensing circuit.

Figure 4:
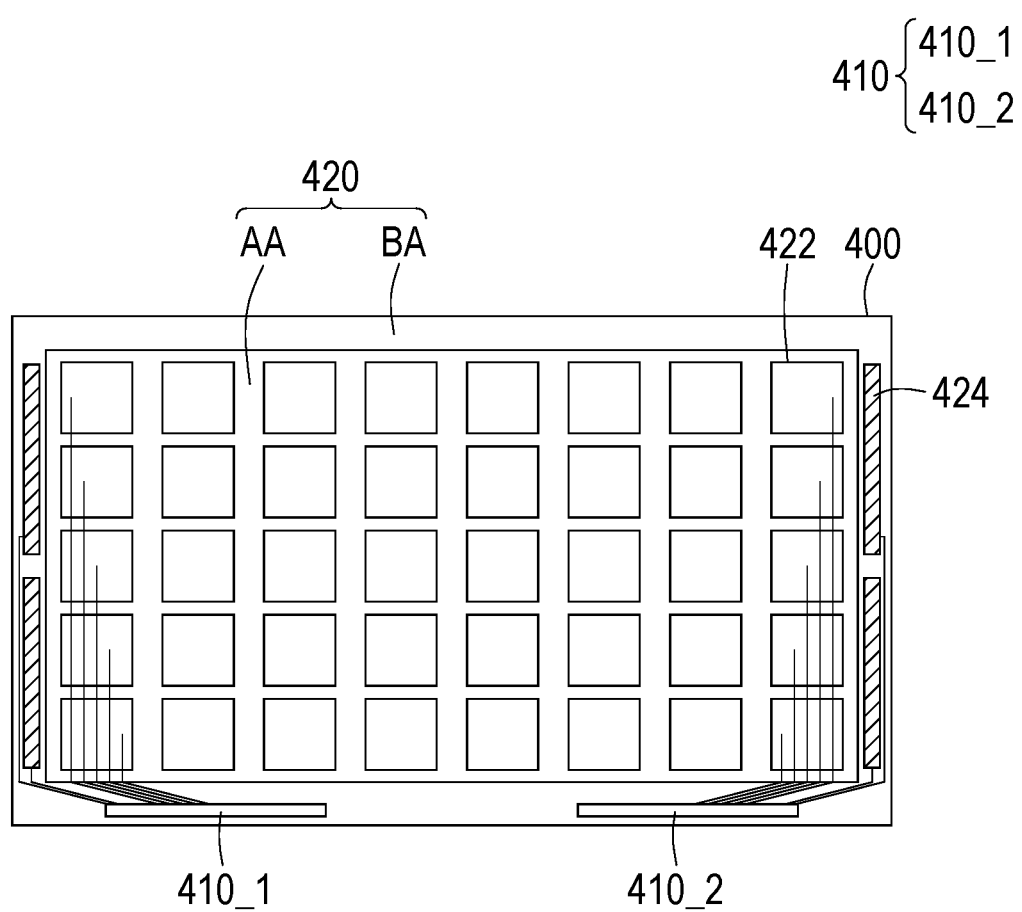
FIG. 4 is a schematic diagram illustrating an electronic device according to another embodiment of the invention.

FIG. 4 is a schematic diagram illustrating an electronic device according to another embodiment of the invention. Referring to FIG. 4, a plurality of first electrodes 422 and at least one second electrode 424 are further depicted in FIG. 4. The touch display panel 420 includes the plurality of first electrodes 422 and the at least one second electrode 424.

The first electrodes 422 are arranged in the active area AA of the touch display panel 420. The first electrodes 422 are block electrodes and serve as touch sensors. The first electrodes 422 are configured to perform a touch sensing operation in a touch sensing period (first period). The second electrodes 424 are arranged in the border area BA of the touch display panel 420. The first electrodes 422 and the second electrodes 424 are configured to perform a gesture sensing operation in a gesture sensing period (second period). In the present embodiment, four second electrodes 424 are taken for example, and every two second electrodes 424 are arranged at two sides of the active area AA, but the invention is not limited thereto.

The driver circuit 410 is coupled to the touch display panel 420. The driver circuit 410 is configured to drive the first electrodes 422 to perform the touch sensing operation in the touch sensing period. The driver circuit 410 is further configured to drive the first electrodes 422 and the second electrodes 424 to perform the gesture sensing operation in the gesture sensing period. In the present embodiment, the driver circuit 410 are implemented as two separate touch with display driver integrated circuits (TDDI ICs) 410_1 and 410_2, but the invention is not limited thereto. The TDDI ICs 410_1 and 410_2 are configured to control and drive respective electrodes.

Figure 5:
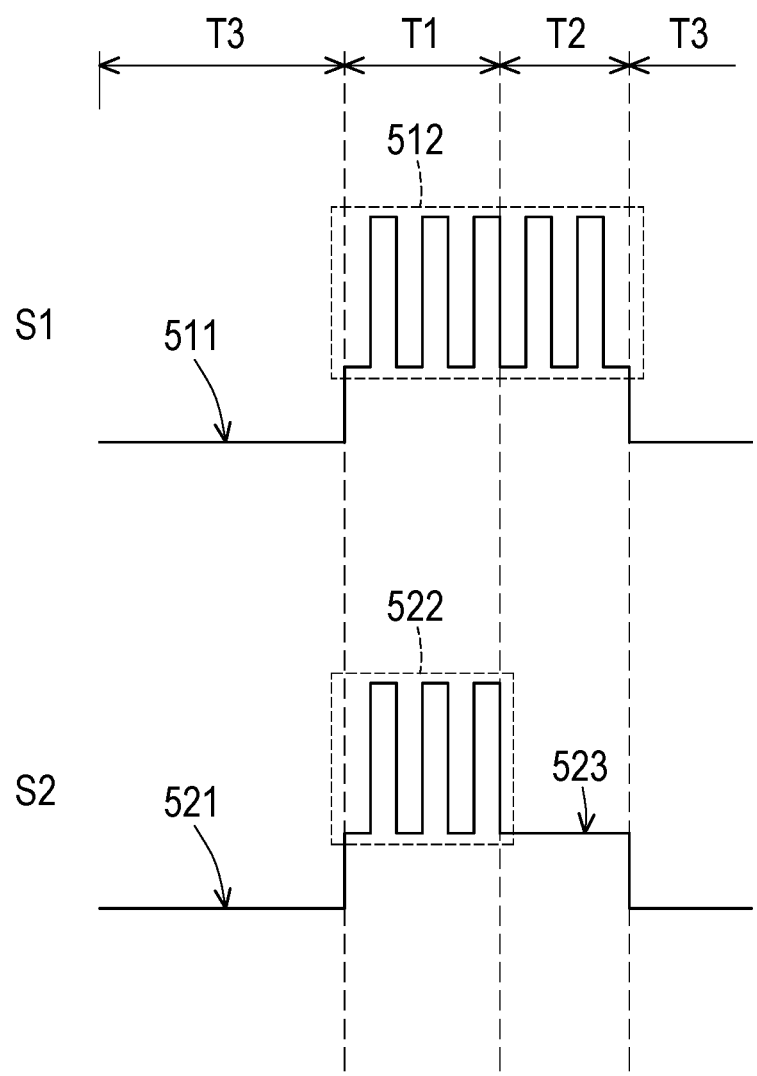
FIG. 5 illustrates driving signals for driving the touch display panel of FIG. 4 according to an embodiment of the invention.

FIG. 5 illustrates driving signals for driving the touch display panel of FIG. 4 according to an embodiment of the invention. Referring to FIG. 4 and FIG. 5, the driver circuit 410 may output signals S1 and S2 to drive the touch display panel 420 to perform the display operation in a display period (third period) T3, the touch sensing operation in the touch sensing period T1, and the gesture sensing operation in the gesture sensing period T2. The signal S1 is applied to the first electrodes 422, and the signal S2 is applied to the second electrodes 424.

In the display period T3, the driver circuit 410 outputs a specified signal 511 to the first electrodes 422 and a synchrotron signal 521 to the second electrodes 424. The specified signal 511 is applied to the first electrodes 422, and the synchrotron signal 521 is applied to the second electrodes 424. The synchrotron signal 521 is the same as the specified signal 511 in the present embodiment. Taking liquid crystal display (LCD) panels for example, the specified signal 511 may be a common voltage. Taking organic light emitting diode (OLED) panels as another example, the specified signal 511 may be a ground voltage or a direct-current (DC) voltage.

In the present embodiment, the synchrotron signal 521 the same as the specified signal 511 is applied to the second electrodes 424 in the display period T3, but the invention is not limited thereto. In an embodiment, the synchrotron signal 521 is not applied to the second electrodes 424, but the driver circuit 410 sets the second electrodes 424 as a floating state. In the floating state, the second electrodes 424 may have high impedance (Hi-Z).

In the touch sensing period T1, the first electrodes 422 are configured as sensing electrodes. The driver circuit 110 outputs a driving signal 512 to drive the first electrodes 422 to perform the touch sensing operation. The driving signal 512 is applied to the first electrodes 422. In the present embodiment, the driving signal 512 is a square wave, but the invention is not limited thereto. On the other hand, in the present embodiment, the synchrotron signal 522 the same as the specified signal 512 is applied to the second electrodes 424 in the touch sensing period T2. In an embodiment, the synchrotron signal 522 is not applied to the second electrodes 424, but the driver circuit 410 sets the second electrodes 424 as the floating state.

In the gesture sensing period T2, the first electrodes 422 are configured as driving electrodes, and the second electrodes 424 are configured as sensing electrodes. The driver circuit 410 outputs the driving signal 512 and a driving signal 523 to perform the gesture sensing operation. The driving signal 512 is applied to the first electrodes 422, and the driving signal 523 is applied to the second electrodes 424. The second electrodes 424 output sensing signals corresponding to the gesture 200 in the gesture sensing period T2. The driver circuit 410 receives the sensing signals from the sensing electrodes 424. In the present embodiment, the driving signal 523 is a DC voltage higher than the synchrotron signal 521, e.g. the common voltage.

The waveforms of the signals S1 and S2 are taken for example, and do not intend to limit the invention. The gesture may be determined according to the capacitance variation of the driver circuit 410 sets the second electrodes 424.

Figure 6:
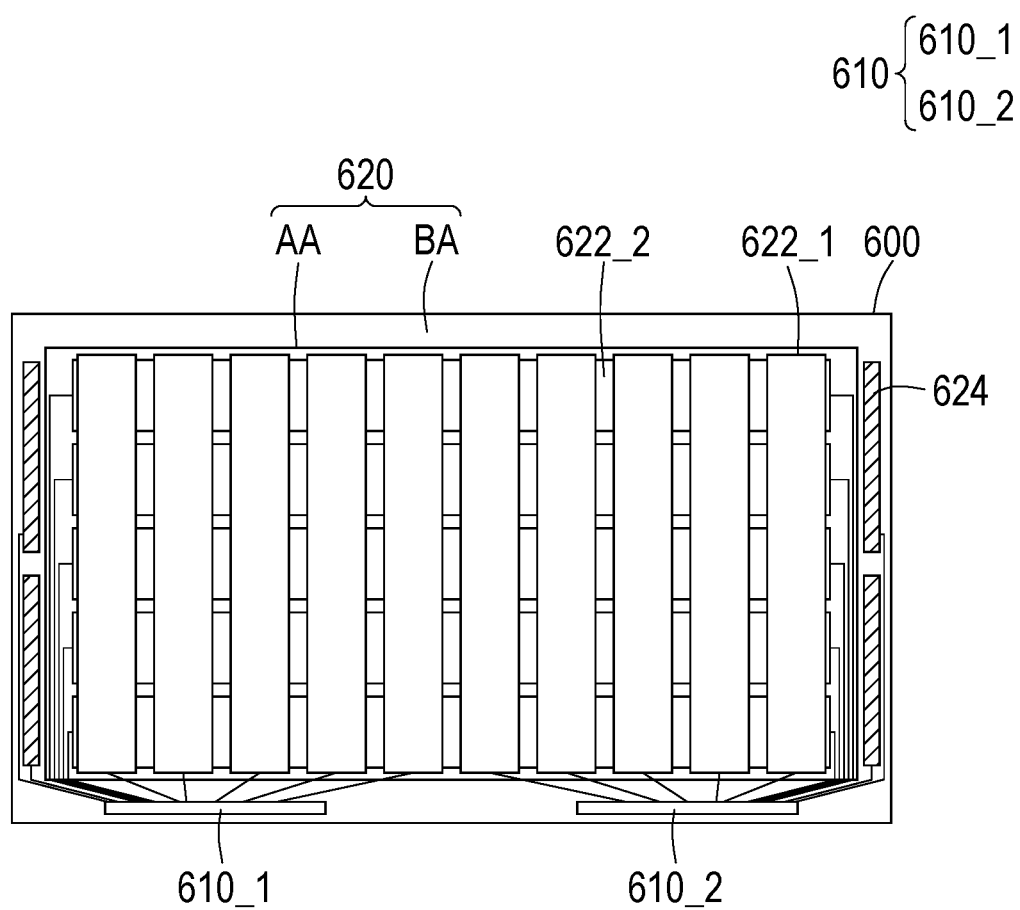
FIG. 6 is a schematic diagram illustrating an electronic device according to another embodiment of the invention.
Figure 7:
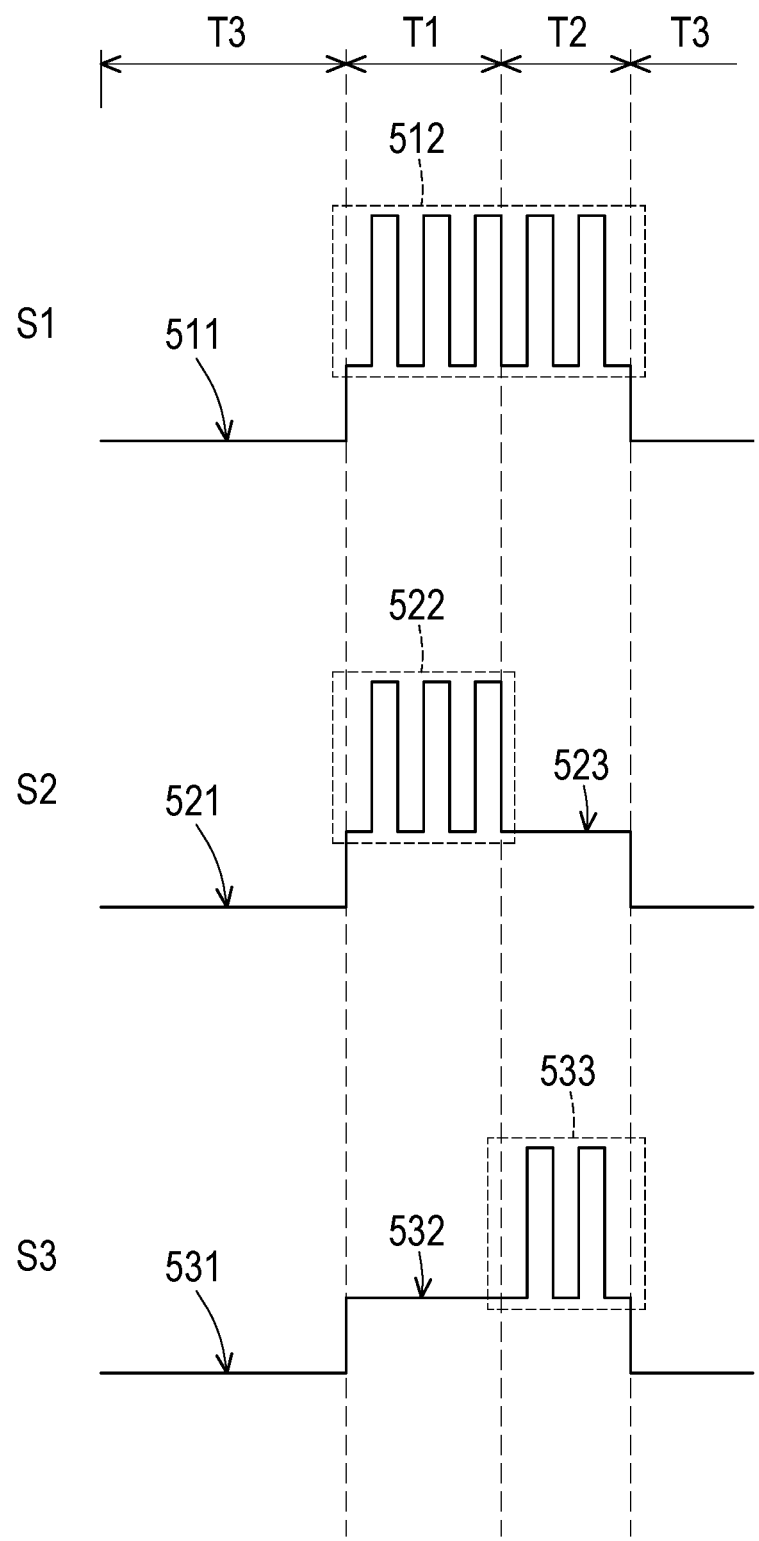
FIG. 7 illustrates driving signals for driving the touch display panel of FIG. 6 according to an embodiment of the invention.

FIG. 6 is a schematic diagram illustrating an electronic device according to another embodiment of the invention. FIG. 7 illustrates driving signals for driving the touch display panel of FIG. 6 according to an embodiment of the invention. Referring to FIG. 6 and FIG. 7, the touch display panel 620 of the present embodiment is similar to the touch display panel 620 of FIG. 4, and the main difference therebetween, for example, lies in the arrangement of the first electrodes 622_1 and 622_2.

The first electrodes 622_1 and 622_2 are perpendicular to each other, and serve as touch sensors in the touch sensing period T1. For example, the first electrodes 622_1 (first part) are configured as driving electrodes, and the first electrodes 622_2 (second part) are configured as sensing electrodes. In other embodiments, according to aspect ratio of panel, the first electrodes 622_1 may be configured as sensing electrodes, and the first electrodes 622_2 may be configured as driving electrodes.

The driver circuit 610 outputs the signals S1, S2 and S3 to drive the touch display panel 620 to perform the display operation in the display period T3, the touch sensing operation in the touch sensing period T1, and the gesture sensing operation in the gesture sensing period T2. The signals S1 and S3 are respectively applied to the first electrodes 622_1 and 622_2, and the signal S2 is applied to the second electrodes 624. The driving manner of the signals S1 and S2 of FIG. 5 are similar to that of the signals S1 and S2 of FIG. 7, and the following description will focus on the signal S3 applied to the first electrodes 622_2.

In the display period T3, the driver circuit 410 outputs a specified signal 531 the same as the specified signal 511 to drive the first electrodes 622_2.

In the touch sensing period T1, the first electrodes 622_1 are configured as driving electrodes, and the first electrodes 622_2 are configured as sensing electrodes. The driver circuit 610 respectively outputs the driving signal 512 and 532 to drive the first electrodes 622_1 and 622_2 to perform the touch sensing operation. The driving signal 532 is a DC voltage higher than the specified signal 531, e.g. the common voltage, but the invention is not limited thereto.

In the gesture sensing period T2, the first electrodes 622_1 and 622_2 are configured as driving electrodes, and the second electrodes 624 are configured as sensing electrodes. The driver circuit 610 outputs a driving signal 533 the same as the driving signal 512 to drive the first electrodes 622_2 to perform the gesture sensing operation.

In the embodiments of FIG. 4 and FIG. 6, four second electrodes 424 or 624 are taken for example, and every two second electrodes 424 or 624 are arranged at two sides of the active area AA, but the invention is not limited thereto.

Figure 8A:
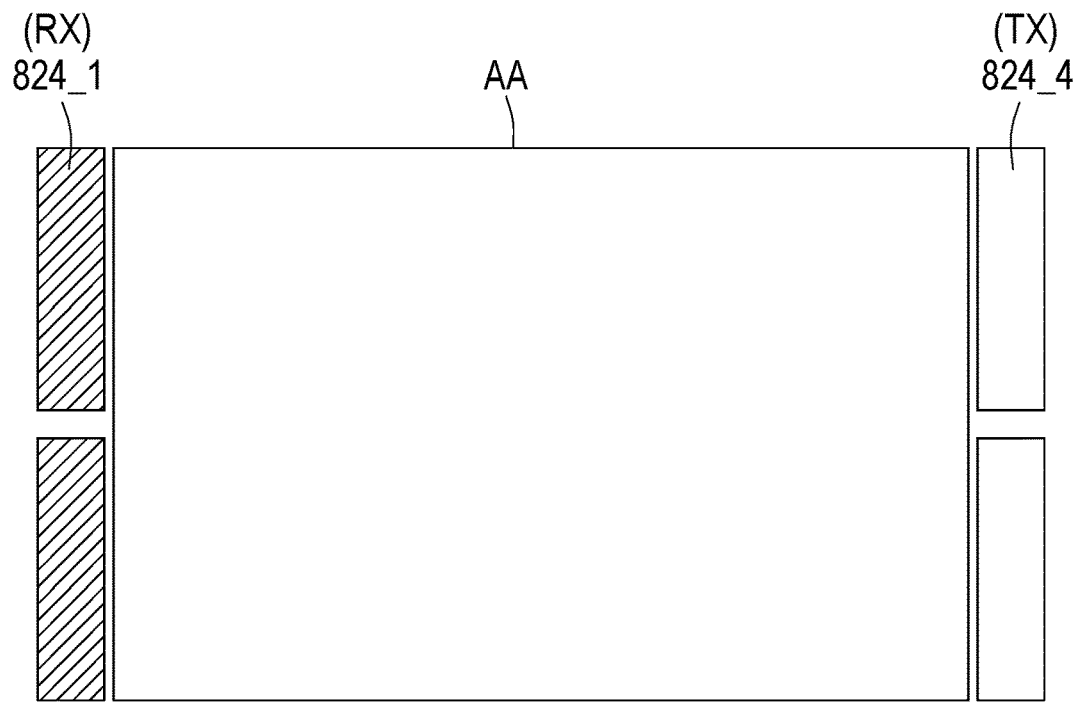
FIG. 8A, FIG. 8B and FIG. 8C respectively illustrate different arrangement of second electrodes according to different embodiments of the invention.
Figure 8B:
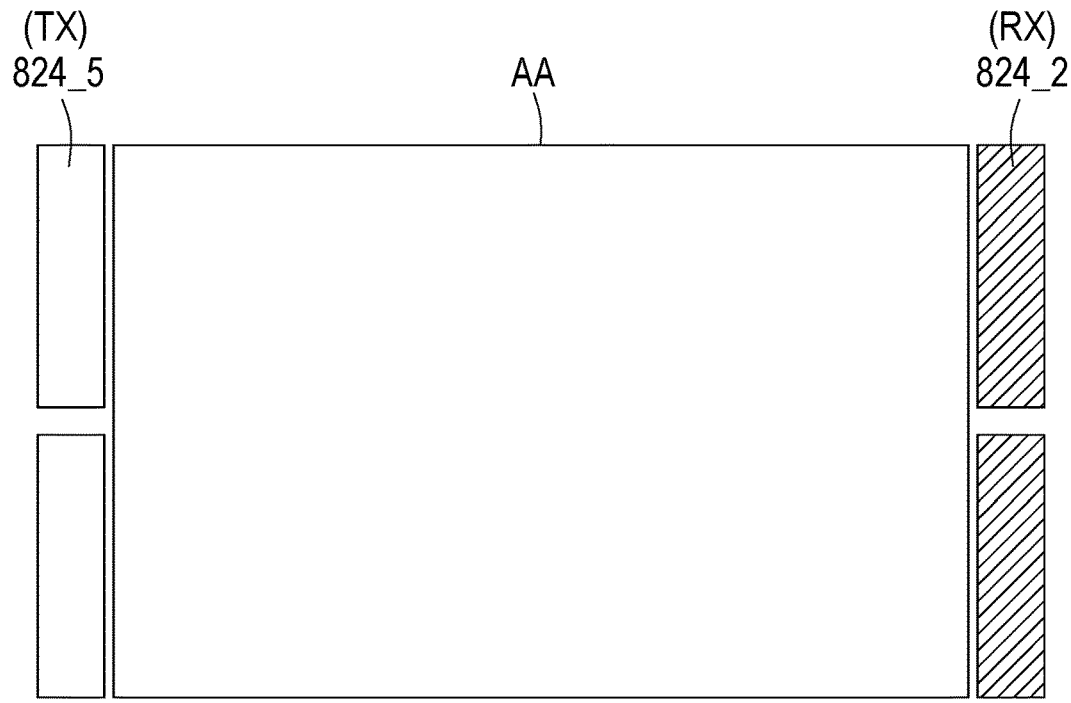
Figure 8C:
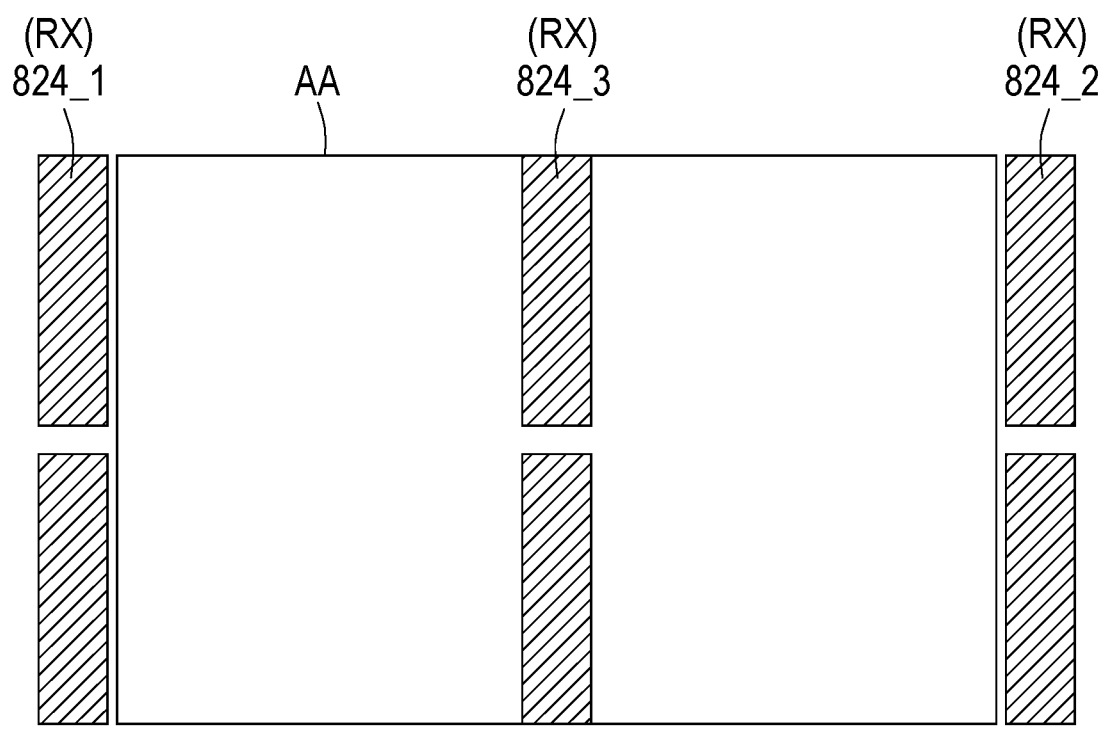

FIG. 8A, FIG. 8B and FIG. 8C respectively illustrate different arrangement of second electrodes according to different embodiments of the invention. For clarity and conciseness, some first electrodes of the active area AA are not shown in FIG. 8A to FIG. 8C. The electrode arrangements shown in FIG. 8A to FIG. 8C do not intend to limit the invention. Referring to FIG. 8A to FIG. 8C, FIG. 8A illustrates two second electrodes 824_1 serving as sensing electrodes RX are arranged at the left side of the active area AA, and two second electrodes 824_4 serving as driving electrodes TX are arranged at the right side of the active area AA. FIG. 8B illustrates two second electrodes 824_2 serving as sensing electrodes RX are arranged at the right side of the active area AA, and two second electrodes 824_5 serving as driving electrodes TX are arranged at the left side of the active area AA. Configuring the second electrodes 824_4 and 824_5 as driving electrodes TX in the gesture sensing period T2 can increase the size of the driving electrode area to increase sensitivity.

In addition, in FIG. 8C, a part of the first electrodes is configured as the second electrodes 824_3. The second electrodes 824_3 serve as sensing electrodes RX in the gesture sensing period T2. The driver circuit 410 or 610 outputs the signal S2 to drive the second electrodes 824_3 to the touch sensing operation in the touch sensing period T1 and the gesture sensing operation in the gesture sensing period T2.

Figure 9A:
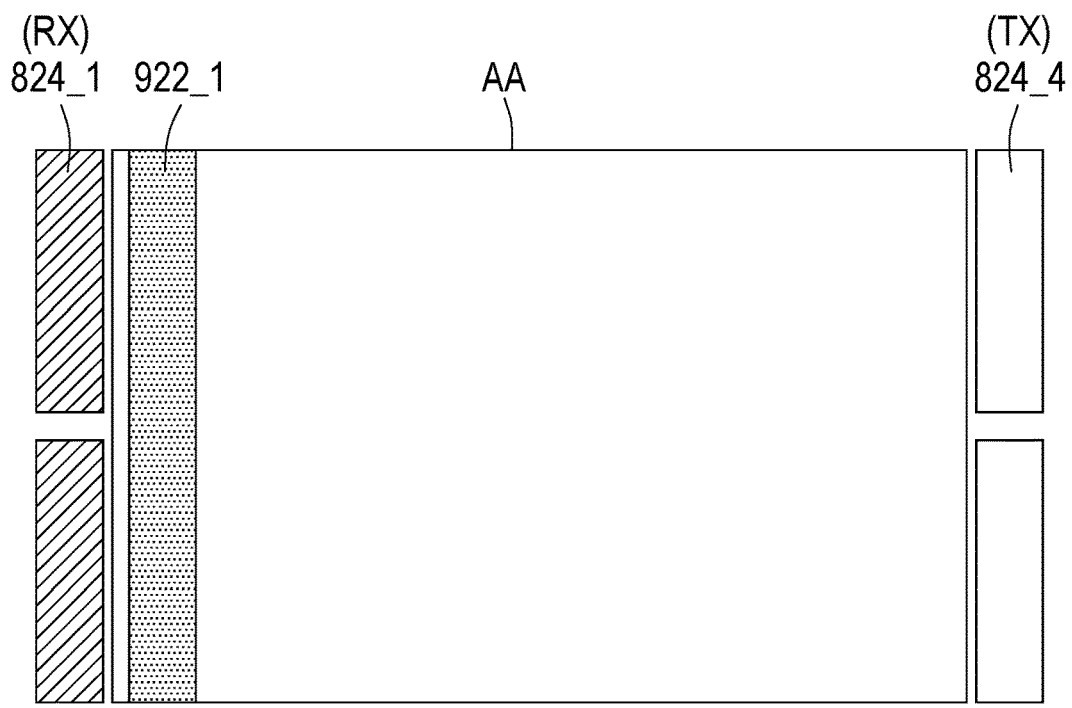
FIG. 9A, FIG. 9B, FIG. 9C and FIG. 9D respectively illustrate different configurations of first electrodes according to different embodiments of the invention.
Figure 9B:
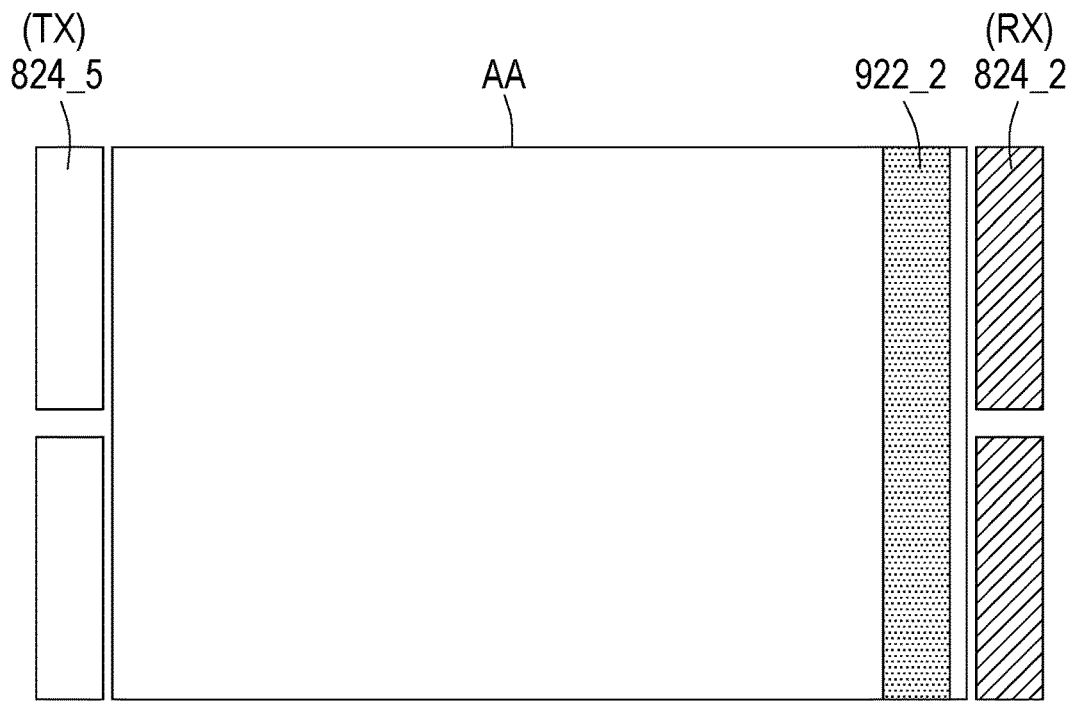
Figure 9C:
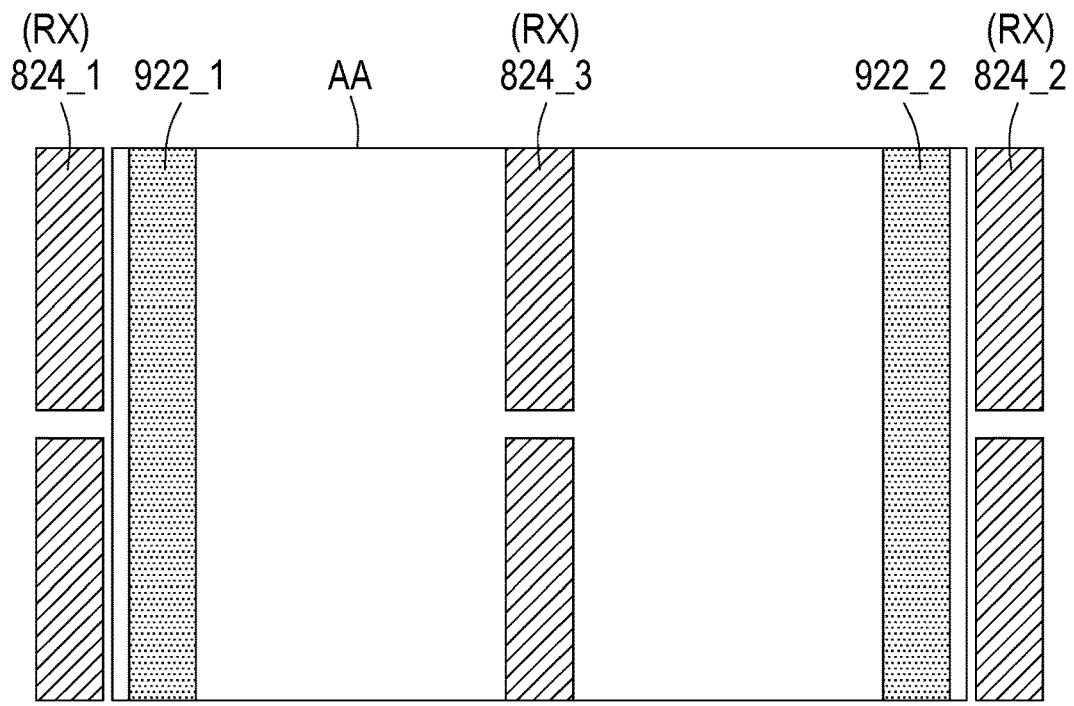
Figure 9D:
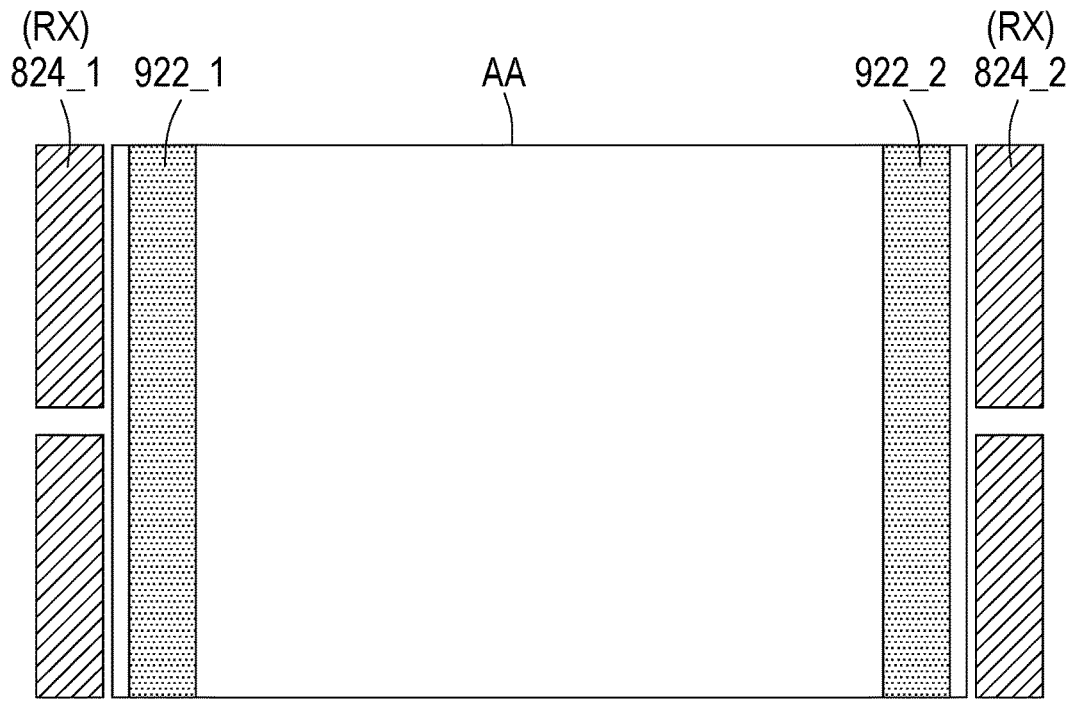

In some embodiments, in order to optimize the distance between the driving electrode TX and the sensing electrode RX of FIG. 2, the driver circuit 110 may set a part of the first electrodes as the floating state in the gesture sensing period T2. FIG. 9A, FIG. 9B, FIG. 9C and FIG. 9D respectively illustrate different configurations of first electrodes according to different embodiments of the invention. For clarity and conciseness, some first electrodes of the active area AA are not shown in FIG. 9A to FIG. 9D. The electrode arrangements shown in FIG. 9A to FIG. 9D do not intend to limit the invention. Referring to FIG. 9A to FIG. 9D, FIG. 9A to FIG. 9C respectively illustrate a part of the first electrodes of FIG. 8A to FIG. 8C is set as the floating state in the gesture sensing period T2. In FIG. 9A, the first electrode 922_1 near the second electrodes 824_1 is set as the floating state in the gesture sensing period T2. In FIG. 9B, the first electrode 922_2 near the second electrodes 824_2 is set as the floating state in the gesture sensing period T2. In FIG. 9C and FIG. 9D, the first electrodes 922_1 and 922_2 near the second electrodes 824_1 and 824_2 are set as the floating state in the gesture sensing period T2.

In summary, in the embodiments of the invention, in the gesture sensing period, touch sensors of the active area are configured as driving electrodes, and gesture sensors of the border area are configured as sensing electrodes through IC setting. When the capacitance between the driving electrodes and the sensing electrodes changes, it indicates a gesture exists and can be detected, and the sensing electrodes may output a sensing signal corresponding to the gesture to the driver circuit, wherein the sensing signal may include information of capacitance variation. The driver circuit can determine whether the gesture exists and drive the touch display panel to perform a corresponding operation according to the sensing signal. Therefore, the gesture sensing operation can be effectively performed, and the edge sensing is relatively sensitive.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch display panel, comprising:
a plurality of first electrodes, arranged in an active area of the touch display panel, and configured to perform a touch sensing operation in a first period; and
at least one second electrode, arranged in a border area of the touch display panel, wherein the plurality of first electrodes and the at least one second electrode are configured to perform a gesture sensing operation in a second period,
wherein a specified signal is applied to the plurality of first electrodes and a synchrotron signal is applied to the at least one second electrode in a third period, wherein the synchrotron signal is a same as the specified signal, and the touch display panel is configured to perform a display operation in the third period,
wherein the touch sensing operation and the gesture sensing operation are not performed in the third period, and the first period, the second period and the third period are time-division multiplexing phases, and
wherein the plurality of first electrodes are configured as driving electrodes, and the at least one second electrode is configured as sensing electrodes in the second period.

2. The touch display panel of claim 1, wherein driving signals are applied to the driving electrodes and the sensing electrodes outputs sensing signals corresponding to a gesture in the second period.

3. The touch display panel of claim 1, wherein a part of the first electrodes is set as a floating state in the second period.

4. The touch display panel of claim 1, wherein a part of the first electrodes is configured as the sensing electrodes in the second period.

5. The touch display panel of claim 1, wherein the plurality of first electrodes are configured as sensing electrodes in the first period.

6. The touch display panel of claim 1, wherein a first part of the first electrodes is configured as driving electrodes and a second part of the first electrodes is configured as sensing electrodes in the secondfirst period.

7. The touch display panel of claim 1, wherein the at least one second electrode is set as a floating state in the third period, wherein the touch display panel is configured to perform the display operation in the third period.

8. The touch display panel of claim 1, wherein the border area is around the active area.

9. An electronic apparatus, comprising:
a touch display panel, comprising a plurality of first electrodes and at least one second electrode, wherein the plurality of first electrodes are arranged in an active area of the touch display panel, and the at least one second electrode is arranged in a border area of the touch display panel; and
a driver circuit, coupled to the touch display panel, and configured to drive the plurality of first electrodes to perform a touch sensing operation in a first period, and drive the plurality of first electrodes and the at least one second electrode to perform a gesture sensing operation in a second period,
wherein the driver circuit outputs a specified signal to the plurality of first electrodes and a synchrotron signal to the at least one second electrode in a third period, wherein the synchrotron signal is a same as the specified signal, and the driver circuit drives the touch display panel to perform a display operation in the third period,
wherein the touch sensing operation and the gesture sensing operation are not performed in the third period, and the first period, the second period and the third period are time-division multiplexing phases, and
wherein the driver circuit configures the plurality of first electrodes as driving electrodes, and the driver circuit configures the at least one second electrode as sensing electrodes in the second period.

10. The electronic apparatus of claim 9, wherein the driver circuit outputs driving signals to the driving electrodes and the driver circuit receives sensing signals corresponding to a gesture from the sensing electrodes in the second period.

11. The electronic apparatus of claim 9, wherein the driver circuit sets a part of the first electrodes as a floating state in the second period.

12. The electronic apparatus of claim 9, wherein the driver circuit configures a part of the first electrodes as the sensing electrodes in the second period.

13. The electronic apparatus of claim 9, wherein the driver circuit configures the plurality of first electrodes as sensing electrodes in the first period.

14. The electronic apparatus of claim 9, wherein the driver circuit configures a first part of the first electrodes as driving electrodes and a second part of the first electrodes as sensing electrodes in the first period.

15. The electronic apparatus of claim 9, wherein the driver circuit sets the at least one second electrode as a floating state in the third period, wherein the driver circuit drives the touch display panel to perform the display operation in the third period.

16. The electronic apparatus of claim 9, wherein the border area is around the active area.

17. A driver circuit, coupled to the touch display panel of claim 1, and configured to drive the plurality of first electrodes to perform the touch sensing operation in the first period, and drive the plurality of first electrodes and the at least one second electrode to perform the gesture sensing operation in the second period.

* * * * *